United States Patent
Won

(10) Patent No.: US 11,248,568 B2
(45) Date of Patent: Feb. 15, 2022

(54) METHOD OF DIAGNOSING A TEMPERATURE SENSOR PROVIDED AT A REAR STAGE OF AN AIR FILTER

(71) Applicants: HYUNDAI MOTOR COMPANY, Seoul (KR); KIA MOTORS CORPORATION, Seoul (KR)

(72) Inventor: Min-Kyu Won, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 263 days.

(21) Appl. No.: 16/747,224

(22) Filed: Jan. 20, 2020

(65) Prior Publication Data
US 2021/0131391 A1 May 6, 2021

(30) Foreign Application Priority Data
Nov. 1, 2019 (KR) .................. 10-2019-0138501

(51) Int. Cl.
*F02D 41/22* (2006.01)
*F02M 35/10* (2006.01)
(Continued)

(52) U.S. Cl.
CPC ....... *F02M 35/1038* (2013.01); *F02D 41/144* (2013.01); *F02D 41/1441* (2013.01);
(Continued)

(58) Field of Classification Search
CPC .................. F02M 35/1038; F02D 41/144
See application file for complete search history.

(56) References Cited

U.S. PATENT DOCUMENTS 7,120,535 B2 * 10/2006 Rahman .................. F01P 11/14
701/114
9,004,751 B2 * 4/2015 Sakurada .............. F02D 41/222
374/1
(Continued)

FOREIGN PATENT DOCUMENTS

DE 102007018623 B3 9/2008
EP 2375044 A1 10/2011
(Continued)

OTHER PUBLICATIONS

European Search Report cited in European patent application No. 20152144.0; dated Jul. 8, 2020; 7 pp.

*Primary Examiner* — Kevin R Steckbauer
(74) *Attorney, Agent, or Firm* — Lempia Summerfield Katz LLC

(57) ABSTRACT

A method of diagnosing a temperature sensor provided at a rear stage of an air filter includes: comparing a heating condition factor with a factor threshold; when the heating condition factor is less than the factor threshold, calculating a deviation between a temperature of an intake manifold and a temperature of intake air at a rear stage of an air filter; comparing a temperature threshold with the deviation; and, when the deviation exceeds the temperature threshold, diagnosing the intake air temperature sensor provided at the rear stage of the air filter as failing. According to the method, failure of a temperature sensor provided at a rear state of an air filter of an engine room can be diagnosed.

14 Claims, 3 Drawing Sheets

(51) Int. Cl.
*F02M 35/02* (2006.01)
*F02D 41/14* (2006.01)
*F02D 41/08* (2006.01)

(52) U.S. Cl.
CPC ....... *F02D 41/222* (2013.01); *F02M 35/0205* (2013.01); *B60Y 2400/302* (2013.01); *F02D 41/08* (2013.01); *F02D 2200/0414* (2013.01); *F02D 2200/501* (2013.01); *F02D 2400/08* (2013.01)

(56) References Cited

U.S. PATENT DOCUMENTS

| | | | | |
|---|---|---|---|---|
| 9,026,399 | B2* | 5/2015 | Nagoshi | F02D 41/222 702/183 |
| 9,534,968 | B2* | 1/2017 | Nakano | G01K 15/007 |
| 9,670,860 | B2* | 6/2017 | Kubota | G01F 1/68 |
| 9,879,598 | B2* | 1/2018 | Hanawa | F02M 26/05 |
| 10,914,261 | B2* | 2/2021 | Ishimasa | F01P 11/16 |
| 2006/0157001 | A1* | 7/2006 | Rahman | F01P 11/14 123/41.15 |
| 2011/0251825 | A1* | 10/2011 | Nagoshi | F02D 41/222 702/183 |
| 2013/0058373 | A1* | 3/2013 | Sakurada | F02D 41/1446 374/4 |
| 2014/0321499 | A1* | 10/2014 | Nakano | G01K 15/007 374/1 |
| 2015/0142338 | A1* | 5/2015 | Nakano | F02M 26/28 702/35 |
| 2015/0285176 | A1* | 10/2015 | Kubota | F02D 41/222 73/114.34 |
| 2016/0169100 | A1* | 6/2016 | Hanawa | F02M 26/05 73/114.68 |
| 2019/0331045 | A1* | 10/2019 | Ishimasa | F02D 41/22 |

FOREIGN PATENT DOCUMENTS

| | | |
|---|---|---|
| JP | 09303191 A | 11/1997 |
| JP | 2010138796 A | 6/2010 |
| KR | 101355621 B1 | 1/2014 |

\* cited by examiner

METHOD OF DIAGNOSING A TEMPERATURE SENSOR PROVIDED AT A REAR STAGE OF AN AIR FILTER

CROSS-REFERENCE(S) TO RELATED APPLICATIONS

This application claims priority to Korean Patent Application No. 10-2019-0138501, filed on Nov. 1, 2019, which is incorporated herein by reference in its entirety.

BACKGROUND OF THE PRESENT DISCLOSURE

Field of the Present Disclosure

Embodiments of the present disclosure relate to a method of diagnosing whether a temperature sensor provided at a rear stage of an air filter of an engine room fails.

Description of the Related Art

Recently, in order to improve fuel efficiency of an engine of a vehicle, an exhaust gas recirculation (EGR) device has been developed and applied.

The EGR device is a device that recirculates some of an exhaust gas, which is an inert gas, to an intake system, mixes the some of the exhaust gas with a mixed gas suctioned into the engine, and decreases a maximum temperature during combustion to reduce generation of $NO_x$ through a method of reducing $NO_x$ in the exhaust gas.

Further, in order to secure driving ability, the EGR device controls some of the exhaust gas to be recirculated to a suction line according to a driving condition by detecting an intake temperature, a temperature of cooling water, and a vehicle speed or a shift gear position under most suitable control.

In other words, referring to FIG. 1, EGR technology is a system configured to obtain an exhaust gas discharged from a cylinder 10 at a rear stage of a main catalyst (not shown) and to deliver the exhaust gas to a front stage of a compressor 20. Since the delivery of the exhaust gas is performed at a lower pressure close to atmospheric pressure, a modifier of a low pressure (LP) added to the EGR technology, and thus the EGR technology is called LP-EGR technology.

Further, in order to deliver a large amount of the exhaust gas through the EGR device in the LP-EGR system, a downstream pressure of an EGR valve 31 should be formed to be smaller than an upstream pressure of the EGR valve 31. Since a pressure at the rear stage of the main catalyst and a pressure at the front stage of the compressor 20 are formed to be a relatively low pressure that is substantially the same as a level of the atmospheric pressure, there may be a case in which a pressure difference between the upstream pressure and the downstream pressure of the EGR valve 31 is not significant.

Thus, in this case, in order to form the downstream pressure to be low to generate a differential pressure, a differential pressure valve (DPV) 32 may be applied to the front stage of the compressor 20. This is a method whereby, when a differential pressure is required, the DPV 32 is controlled in a closing direction thereof to form a negative pressure at the front stage of the compressor 20.

An undescribed reference numeral 33 denotes a throttle valve.

In such an LP-EGR system, in order to determine whether the use of EGR is available, condensate calculation is performed and a measured temperature value of air before joining to the EGR is used as a physical value for calculating condensate through a mass air flow (MAF) temperature sensor 41.

Further, the MAF temperature sensor 41 should undergo failure diagnosis in accordance with North American on-board diagnostics (OBD) regulations. The EGR system should be used only when a corresponding value is reasonably usable.

According to a related art, since there is no need to refer to a temperature value at a rear stage of the air filter 50, a temperature sensor such as the MAF temperature sensor 41 is not used. Therefore, there is no need to separately implement a failure diagnosis logic.

The contents described in the above Description of the Related Art are to help understand the background of the present disclosure. Thus, this section may include what is not previously known to a person of ordinary skill in the art to which the present disclosure pertains.

SUMMARY OF THE PRESENT DISCLOSURE

An embodiment of the present disclosure is directed to a method of diagnosing whether a temperature sensor provided at a rear stage of an air filter of an engine room fails.

Other objects and advantages of the present disclosure can be understood by the following description and should become apparent with reference to the embodiments of the present disclosure. Also, it should be evident to those having ordinary skill in the art to which the present disclosure pertains that the objects and advantages of the present disclosure can be realized by the embodiments as claimed and combinations thereof.

In accordance with an embodiment of the present disclosure, a method of diagnosing a temperature sensor provided at a rear stage of an air filter is provided. The method includes comparing a heating condition factor, which is calculated with a weight according to whether heat is generated inside an engine room, with a factor threshold. The method includes, when the heating condition factor is less than the factor threshold, calculating a deviation between a temperature of an intake manifold, which is measured by an intake manifold temperature sensor, with a temperature of intake air at a rear stage of an air filter, which is measured by an intake air temperature sensor provided at the rear stage of the air filter. The method includes comparing a temperature threshold with the deviation between the temperature of the intake manifold and the temperature of the intake air at the rear stage of the air filter. The method also includes, when the deviation between the temperature of the intake manifold and the temperature of the intake air at the rear stage of the air filter exceeds the temperature threshold, diagnosing the intake air temperature sensor provided at the rear stage of the air filter as failing.

The intake manifold temperature sensor may be a temperature sensor inside a manifold absolute pressure (MAP) sensor. The intake air temperature sensor provided at the rear stage of the air filter may be a temperature sensor inside a mass air flow (MAF) sensor.

Further, before the comparing of the heating condition factor with the factor threshold, the method may further include determining whether a vehicle is idling. The heating condition factor may be increased or decreased according to whether the vehicle is idling.

When the vehicle is determined as idling through the determination of whether the vehicle is idling, the method may further include increasing the heating condition factor according to a revolutions per minute (RPM) of an engine.

Alternatively, when the vehicle is determined as not idling through the determination of whether the vehicle is idling, the method may further include decreasing the heating condition factor according to a vehicle speed.

Further, before the determination of whether the vehicle is idling, the method may further include determining whether an operating condition of a diagnostic logic is satisfied while the vehicle is driving.

The operating condition of the diagnostic logic may include that the vehicle speed exceeds a vehicle speed setting value, a flow rate through a throttle valve exceeds a flow rate setting value, and/or a cooling water temperature of engine cooling water exceeds a water temperature setting value.

The calculation of the deviation between the temperature of the intake manifold and the temperature of the intake air at the rear stage of the air filter may include storing and updating a maximum value and a minimum value of the deviation between the temperature of the intake manifold and the temperature of the intake air at the rear stage of the air filter.

In accordance with another embodiment of the present disclosure, a method of diagnosing a temperature sensor provided at a rear stage of an air filter is provided. The method includes determining whether a vehicle is idling. The method includes, when the vehicle is determined as idling through the determination of whether the vehicle is idling, increasing a heating condition factor according to an RPM of an engine. The method includes, when the vehicle is determined as not idling through the determination of whether the vehicle is idling, decreasing the heating condition factor according to a vehicle speed. The method includes comparing a heating condition factor, which is increased or decreased with a weight according to whether heat is generated inside an engine compartment, with a factor threshold. The method includes, when the heating condition factor is less than the factor threshold, calculating a deviation between a temperature of an intake manifold, which is measured by an intake manifold temperature sensor, and a temperature of intake air at a rear stage of an air filter, which is measured by an intake air temperature sensor provided at the rear stage of the air filter. The method includes comparing a temperature threshold with the deviation between the temperature of the intake manifold and the temperature of the intake air at the rear stage of the air filter. The method also includes, when the deviation between the temperature of the intake manifold and the temperature of the intake air at the rear stage of the air filter exceeds the temperature threshold, diagnosing the intake air temperature sensor provided at the rear stage of the air filter as failing.

The intake manifold temperature sensor may be a temperature sensor inside a MAP sensor. The intake air temperature sensor provided at the rear stage of the air filter may be a temperature sensor inside a MAF sensor.

Further, before the determination of whether the vehicle is idling, the method may further include determining whether an operating condition of a diagnostic logic is satisfied while the vehicle is driving. The operating condition of the diagnostic logic may include that the vehicle speed exceeds a vehicle speed setting value, a flow rate through a throttle valve exceeds a flow rate setting value, and/or a cooling water temperature of engine cooling water exceeds a water temperature setting value.

Further, the calculation of the deviation between the temperature of the intake manifold and the temperature of the intake air at the rear stage of the air filter may include storing and updating a maximum value and a minimum value of the deviation between the temperature of the intake manifold and the temperature of the intake air at the rear stage of the air filter.

DESCRIPTION OF SPECIFIC EMBODIMENTS

Reference should be made to the accompanying drawings, which illustrate embodiments of the present disclosure, and to the description in the accompanying drawings in order to fully understand the present disclosure, operational advantages of the present disclosure, and objects attained by practicing the present disclosure.

In the description of embodiments of the present disclosure, known technologies or repetitive descriptions, which unnecessarily obscure the gist of the present disclosure may have been reduced or omitted.

Figure 1:
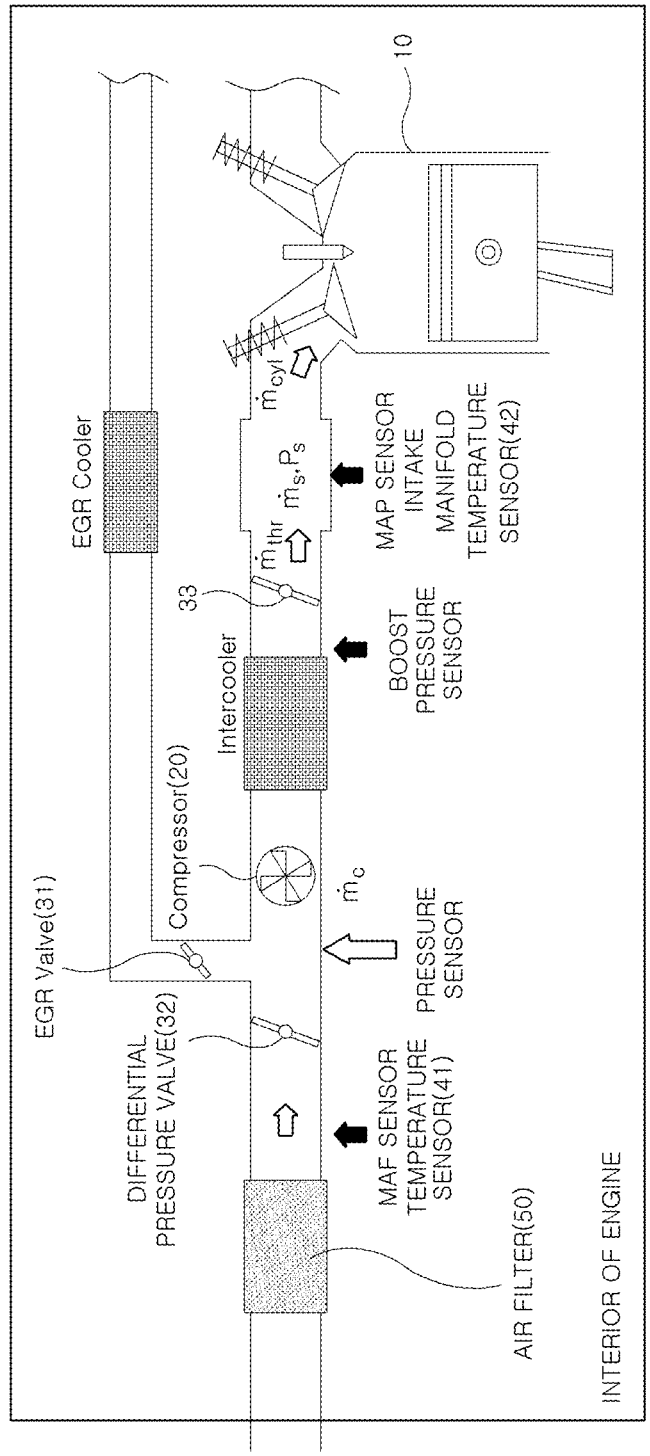
FIG. 1 is a diagram illustrating an intake system to which a method of diagnosing a temperature sensor provided at a rear stage of an air filter according to the present disclosure is applied.
Figure 2:
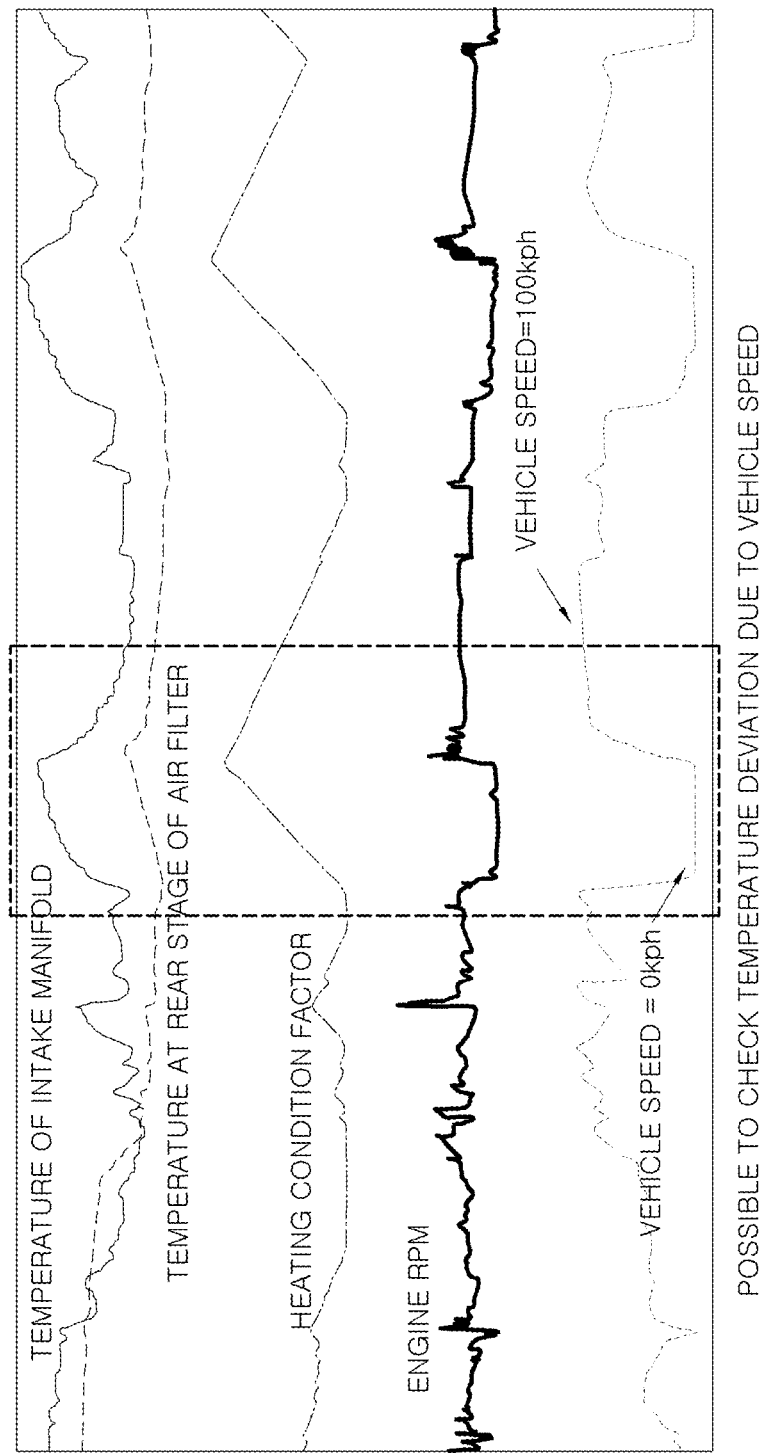
FIG. 2 is a graph showing a temperature deviation and a heating condition factor due to a vehicle speed.

FIG. 1 is a diagram illustrating an intake system to which a method of diagnosing a temperature sensor provided at a rear stage of an air filter according to the present disclosure is applied. FIG. 2 is a graph showing a temperature deviation and a heating condition factor due to a vehicle speed.

Figure 3:
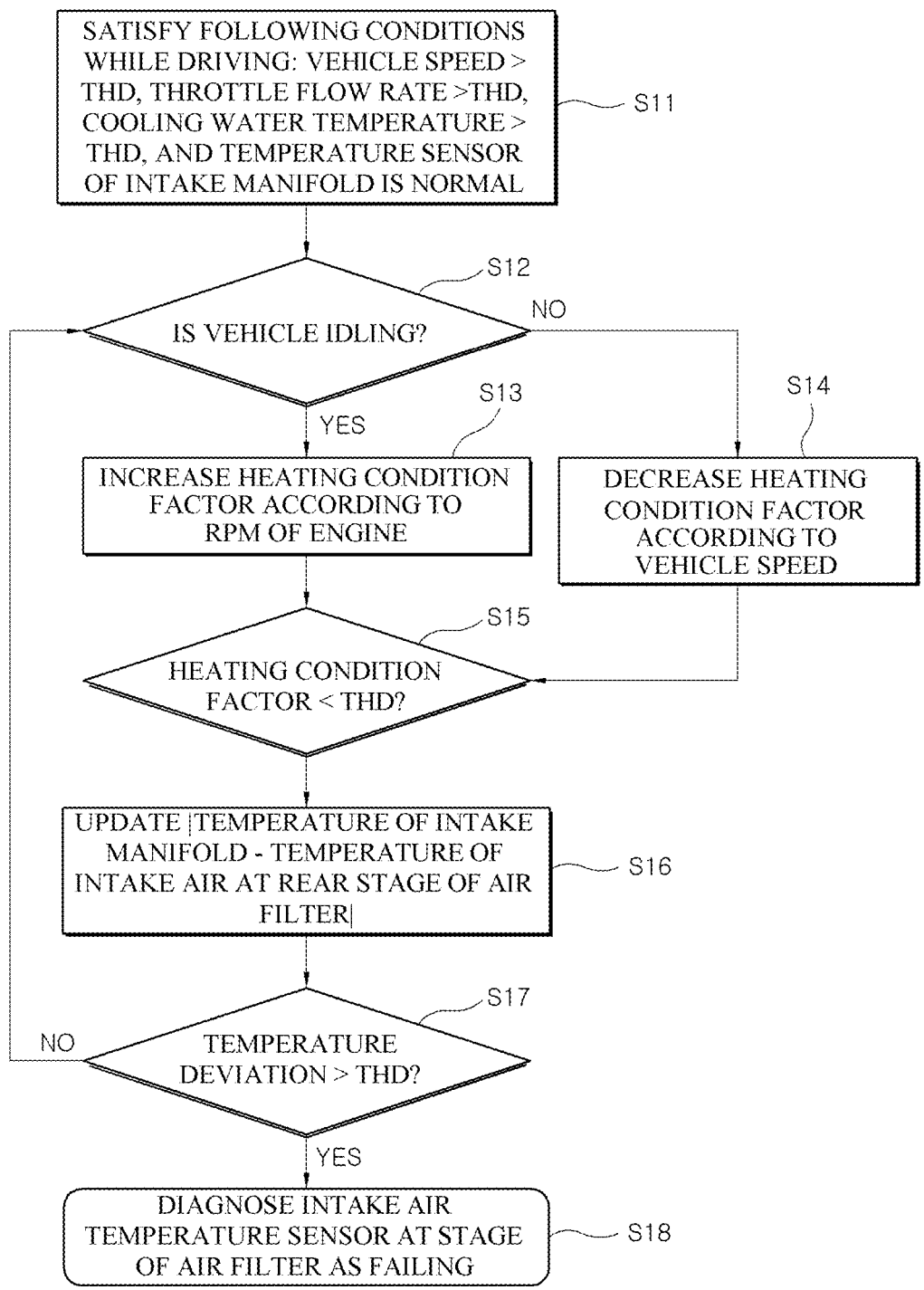
FIG. 3 is a diagram illustrating a flowchart of a method of diagnosing a temperature sensor provided at a rear stage of an air filter according to the present disclosure.

Further, FIG. 3 is a diagram illustrating a flowchart of a method of diagnosing a temperature sensor provided at a rear stage of an air filter according to the present disclosure.

Hereinafter, a method of diagnosing a temperature sensor provided at a rear stage of an air filter according to one embodiment of the present disclosure is described with reference to FIGS. 1-3.

The present disclosure is a method for diagnosing whether an intake air temperature sensor 41 (mass air flow (MAF) temperature sensor) provided at a rear stage of an air filter 50 fails in a system to which an exhaust gas recirculation (EGR) device is applied.

The intake air temperature sensor 41 provided at the rear stage of the air filter 50 is a temperature sensor, which is constituted inside a MAF sensor.

A temperature at the rear stage of the air filter 50 is a temperature measured at a position at which outside air is introduced into an engine compartment. Thus, the temperature is measured as a certain value between a temperature of the outside air and a temperature of the engine compartment.

There is a method of calculating the temperature at the corresponding position through an accurate physical model. However, in terms of minimizing inaccuracy of a model and unnecessary calculation, the present disclosure proposes a method of performing diagnosis by directly comparing measured ambient temperatures instead of a separate temperature model.

In other words, among temperature sensors applied to the existing system, another temperature sensor capable of representing a temperature inside the engine compartment is a temperature sensor embedded in an intake air pressure sensor (manifold absolute pressure (MAP) sensor).

However, considering a physical distance from the intake air temperature sensor 41 provided at the rear stage of the air filter 50 and a distance from a heating element inside the engine, a temperature value of a corresponding position does not always exhibit a similar tendency.

Therefore, the present disclosure proposes a method of defining a time point at which failure diagnosis is possible through a comparison between temperature sensors inside the engine compartment to be capable of diagnosing a failure at the corresponding time point.

To this end, a correlation between a temperature inside the engine compartment and a vehicle speed is described with reference to FIG. 2. The temperature inside the engine compartment has a high correlation with the vehicle speed.

In other words, a temperature of an intake manifold temperature sensor 42 relatively close to the engine is higher than that of the intake air temperature sensor 41 provided at the rear stage of the air filter 50. However, when a vehicle speed is present, tendencies of the temperatures are very similar to each other. When the vehicle is moving at speed, an intake manifold is cooled due to a driving wind such that a difference between the temperatures is not significantly increased. Therefore, when the vehicle is driving at speed, a constant offset may be applied for comparison and failure diagnosis. However, when the vehicle is in a stop state, since a driving wind which cools the temperature of the intake manifold is not present, a temperature difference between the two temperature sensors 41 and 42 is significantly increased.

Therefore, a heating condition factor of a temperature of the engine compartment is defined. The heating condition factor is defined to diagnose a failure by comparing temperatures of the two temperature sensors 41 and 42 only when the heating condition factor does not exceed a threshold. When the vehicle is stopped and idling, the heating condition factor is increased based on a revolutions per minute (RPM) of the engine. That is, an amount of heating may be varied according to the RPM of the engine so that a weight of an increment is applied based on the RPM of the engine.

Further, when the vehicle is being driven at speed, the heating condition factor is decreased based on the vehicle speed. That is, an amount of cooling may be varied according to the vehicle speed so that a weight of a decrement is applied based on the vehicle speed.

Therefore, the threshold of the corresponding factor is selected in an environment in which a deviation between the two sensors 41 and 42 is small, and diagnosis is set to be possible at only a value less than the threshold.

Referring to FIG. 3, when an operating condition of a diagnostic logic is satisfied while a vehicle is driving (S11), a process of the present disclosure starts.

The corresponding operating condition includes that: the vehicle speed should be greater than a vehicle speed setting value; a throttle flow rate should be greater than a flow rate setting value; and a cooling water temperature of engine cooling water is higher than a water temperature setting value so that the engine should warm up.

Further, the intake manifold temperature sensor 42 should be in a normal condition.

Next, whether the vehicle is idling is determined (S12).

According to the determination result of whether the vehicle is idling, when the vehicle is idling, a heating condition factor is increased according to an RPM of the engine (S13).

Otherwise, when the vehicle is driving in a partially loaded state, the heating condition factor is decreased according to the vehicle speed (S14).

As described above, after the heating condition factor is increased or decreased according to the situation, it is determined whether the heating condition factor is less than a factor threshold (S15).

In the present disclosure, it is possible, only in the situation in which the heating condition factor is less than the factor threshold, to compare a temperature due to the intake manifold temperature sensor 42 with a temperature of intake air at the rear stage of the air filter 50 due to the intake air temperature sensor 41. When the condition of S15 is satisfied, an absolute value of a difference between a temperature of the intake manifold and a temperature of the intake air at the rear stage of the air filter 50 is calculated and updated (S16).

Then, whether a temperature deviation calculated in S16 exceeds a temperature threshold is determined (S17). When the temperature deviation exceeds the temperature threshold, the intake air temperature sensor 41 (MAF sensor) provided at the rear stage of the air filter 50 is diagnosed as failing (S18).

That is, the deviation between the temperature of the intake manifold and the temperature of the intake air at the rear stage of the air filter 50 is calculated through S16 to update a maximum value and a minimum value, and, when the calculated deviation exceeds the temperature threshold, the intake air temperature sensor 41 is diagnosed as failing.

As described above, in accordance with the present disclosure, whether the temperature sensor provided at the rear stage of the air filter fails is diagnosed under predetermined conditions such that it is possible to diagnose OBD and perform a more accurate condensate calculation using a corresponding sensor. Consequently, accurate calculation of a condensate flow rate allows EGR to be used in wide areas. Thus, fuel efficiency can be improved.

In accordance with a method of diagnosing a temperature sensor provided at a rear stage of an air filter according to the present disclosure, the method diagnoses whether a temperature sensor provided at a rear stage of an air filter has failed under predetermined conditions such that it is possible to diagnose the OBD.

Therefore, it is possible to perform a more accurate condensate calculation using a corresponding sensor. Consequently, accurate calculation of a condensate flow rate allows EGR to be used in wide areas. Thus, fuel efficiency can be improved.

While the present disclosure has been described with respect to the specific embodiments, it should be apparent to those having ordinary skill in the art that various changes and modifications may be made without departing from the spirit and scope of the present disclosure as defined in the following claims. Accordingly, it should be noted that such alterations or modifications fall within the claims of the present disclosure, and the scope of the present disclosure should be construed on the basis of the appended claims.

What is claimed is:

1. A method of diagnosing a temperature sensor provided at a rear stage of an air filter, the method comprising:
    comparing a heating condition factor, which is calculated with a weight according to whether heat is generated inside an engine compartment, with a factor threshold;
    in response to the heating condition factor being less than the factor threshold, calculating a deviation between a temperature of an intake manifold, which is measured by an intake manifold temperature sensor, and a temperature of intake air at a rear stage of an air filter, which is measured by an intake air temperature sensor provided at the rear stage of the air filter;

comparing a temperature threshold with the deviation between the temperature of the intake manifold and the temperature of the intake air at the rear stage of the air filter; and in response to the deviation between the temperature of the intake manifold and the temperature of the intake air at the rear stage of the air filter exceeding the temperature threshold, diagnosing the intake air temperature sensor provided at the rear stage of the air filter as failing.

2. The method of claim 1, wherein the intake manifold temperature sensor includes a temperature sensor inside a manifold absolute pressure (MAP) sensor, and the intake air temperature sensor provided at the rear stage of the air filter includes a temperature sensor inside a mass air flow (MAF) sensor.

3. The method of claim 1, further comprising:
before the comparing of the heating condition factor with the factor threshold, determining whether a vehicle is idling,
wherein the heating condition factor is increased or decreased according to the determination of whether the vehicle is idling.

4. The method of claim 3, further comprising:
in response to the vehicle being determined as idling through the determination of whether the vehicle is idling, increasing the heating condition factor according to a revolutions per minute (RPM) of an engine.

5. The method of claim 3, further comprising:
in response to the vehicle being determined as not idling through the determination of whether the vehicle is idling, decreasing the heating condition factor according to a vehicle speed.

6. The method of claim 4, further comprising:
before the determination of whether the vehicle is idling, determining whether an operating condition of a diagnostic logic is satisfied while the vehicle is driving.

7. The method of claim 6, wherein the operating condition of a diagnostic logic includes that the vehicle speed exceeds a vehicle speed setting value, a flow rate through a throttle valve exceeds a flow rate setting value, and a cooling water temperature of engine cooling water exceeds a water temperature setting value.

8. The method of claim 5, further comprising:
before the determination of whether the vehicle is idling, determining whether an operating condition of a diagnostic logic is satisfied while the vehicle is driving.

9. The method of claim 8, wherein the operating condition of a diagnostic logic includes that the vehicle speed exceeds a vehicle speed setting value, a flow rate through a throttle valve exceeds a flow rate setting value, and a cooling water temperature of engine cooling water exceeds a water temperature setting value.

10. The method of claim 3, wherein the calculation of the deviation between the temperature of the intake manifold and the temperature of the intake air at the rear stage of the air filter includes storing and updating a maximum value and a minimum value of the deviation between the temperature of the intake manifold and the temperature of the intake air at the rear stage of the air filter.

11. A method of diagnosing a temperature sensor provided at a rear stage of an air filter, the method comprising:
determining whether a vehicle is idling;
in response to the vehicle being determined as idling through the determination of whether the vehicle is idling, increasing a heating condition factor according to a revolution per minute (RPM) of an engine;
in response to the vehicle being determined as not idling through the determination of whether the vehicle is idling, decreasing the heating condition factor according to a vehicle speed;
comparing a heating condition factor, which is increased or decreased with a weight according to whether heat is generated inside an engine compartment, with a factor threshold;
in response to the heating condition factor being less than the factor threshold, calculating a deviation between a temperature of an intake manifold, which is measured by an intake manifold temperature sensor, and a temperature of intake air at a rear stage of an air filter, which is measured by an intake air temperature sensor provided at the rear stage of the air filter;
comparing a temperature threshold with the deviation between the temperature of the intake manifold and the temperature of the intake air at the rear stage of the air filter; and
in response to the deviation between the temperature of the intake manifold and the temperature of the intake air at the rear stage of the air filter exceeding the temperature threshold, diagnosing the intake air temperature sensor provided at the rear stage of the air filter as failing.

12. The method of claim 11, wherein the intake manifold temperature sensor includes a temperature sensor inside a manifold absolute pressure (MAP) sensor, and the intake air temperature sensor provided at the rear stage of the air filter includes a temperature sensor inside a mass air flow (MAF) sensor.

13. The method of claim 11, further comprising:
before the determination of whether the vehicle is idling, determining whether an operating condition of a diagnostic logic is satisfied while the vehicle is driving,
wherein the operating condition of the diagnostic logic includes that the vehicle speed exceeds a vehicle speed setting value, a flow rate through a throttle valve exceeds a flow rate setting value, and a cooling water temperature of engine cooling water exceeds a water temperature setting value.

14. The method of claim 11, further comprising:
the calculation of the deviation between the temperature of the intake manifold and the temperature of the intake air at the rear stage of the air filter includes storing and updating a maximum value and a minimum value of the deviation between the temperature of the intake manifold and the temperature of the intake air at the rear stage of the air filter.

\* \* \* \* \*